United States Patent
Reinold et al.

(10) Patent No.: US 7,647,615 B1
(45) Date of Patent: Jan. 12, 2010

(54) METHOD AND SYSTEM FOR DISTRIBUTING DIGITAL AUDIO AND VIDEO TO AN ANALOG WIRELESS DEVICE

(75) Inventors: Jurgen Reinold, Phoenix, AZ (US); David Knappenberger, Tempe, AZ (US); Mathew Cucuzella, Phoenix, AZ (US); Jack Scott Geranen, Phoenix, AZ (US); Jeff Lee, Phonenix, AZ (US); Michael E. Williams, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 1802 days.

(21) Appl. No.: 09/071,046

(22) Filed: May 4, 1998

(51) Int. Cl.
*H04N 60/32* (2006.01)
*H04N 7/173* (2006.01)

(52) U.S. Cl. .............................. 725/106; 725/18; 725/86

(58) Field of Classification Search .................. 725/18, 725/81, 86, 105, 59, 68, 100, 131, 139, 151; 348/723, 724, 555, 572
See application file for complete search history.

(56) References Cited

U.S. PATENT DOCUMENTS

| | | | | |
|---|---|---|---|---|
| 5,650,827 A | * | 7/1997 | Tsumori et al. | |
| 5,729,549 A | * | 3/1998 | Kostreski et al. | 370/522 |
| 5,757,416 A | * | 5/1998 | Birch et al. | 725/86 |
| 5,758,294 A | * | 5/1998 | Ganesan et al. | 455/561 |
| 5,784,572 A | * | 7/1998 | Rostoker et al. | 395/200.77 |
| 5,841,979 A | * | 11/1998 | Schulhof et al. | 395/200.67 |
| 5,877,821 A | * | 3/1999 | Newlin et al. | 348/724 |
| 5,946,045 A | * | 8/1999 | Ozkan et al. | 348/467 |
| 6,011,546 A | * | 1/2000 | Bertram | 345/327 |
| 6,011,579 A | * | 1/2000 | Newlin | 348/15 |
| 6,055,357 A | * | 4/2000 | Nagasawa et al. | |
| 6,788,882 B1 | * | 9/2004 | Geer et al. | |

* cited by examiner

Primary Examiner—Hunter B. Lonsberry

(57) ABSTRACT

An audio input interface (122) receives a digital audio signal and identifies an audio bitstream which is optionally decrypted by a decryption unit (123), and decoded by an audio decoding unit (124). An audio digital to analog converter (126) converts the decoded audio bitstream to an analog audio signal which is optionally decrypted by an audio analog decryption unit (127) and output by an audio output interface (128) to an analog wireline device (100). A video input interface (142) receives a digital video signal and identifies a video bitstream which is optionally decrypted by a video digital decryption unit (143), and decoded by a video decoding unit (144). A video digital to analog converter (146) converts the decoded video bitstream to an analog video signal that is optionally decrypted by a video analog decryption unit (147) and output by a video output interface (148) to the analog wireline device (100).

30 Claims, 3 Drawing Sheets

METHOD AND SYSTEM FOR DISTRIBUTING DIGITAL AUDIO AND VIDEO TO AN ANALOG WIRELESS DEVICE

RELATED INVENTIONS

The present invention is related to the following inventions which are assigned to the same assignee as the present invention:

Method and System for Broadcasting Digital Audio and Video to an Analog Wireless Device, filed May 4, 1998, having Ser. No. 09/071,045.

Method and System for Broadcasting/Distributing Digital Audio and Video to a Television, filed May 4, 1998, having Ser. No. 09,071,368.

Method and System for Broadcasting Digital Audio to Radio, filed May 4, 1998, having Ser. No. 09/071,047.

FIELD OF THE INVENTION

The present invention relates generally to digital audio and video.

BACKGROUND OF THE INVENTION

A wide variety of digital audio and video content currently exists. For example, computers can process or store audio and video data obtained via the internet and other sources. Consumption of digital audio and video is currently confined, however, to devices designed to accept a specific form of input. For example, a computer can play digital audio and video provided in a specific digital format which the computer is configured to process, but a current television cannot play the same digital audio and video data because it is designed to receive an entirely different form of input. Accordingly, it would be desirable to have the capability of playing digital audio and video with devices designed to receive a different form of input.

DETAILED DESCRIPTION OF THE DRAWINGS

Figure 1:
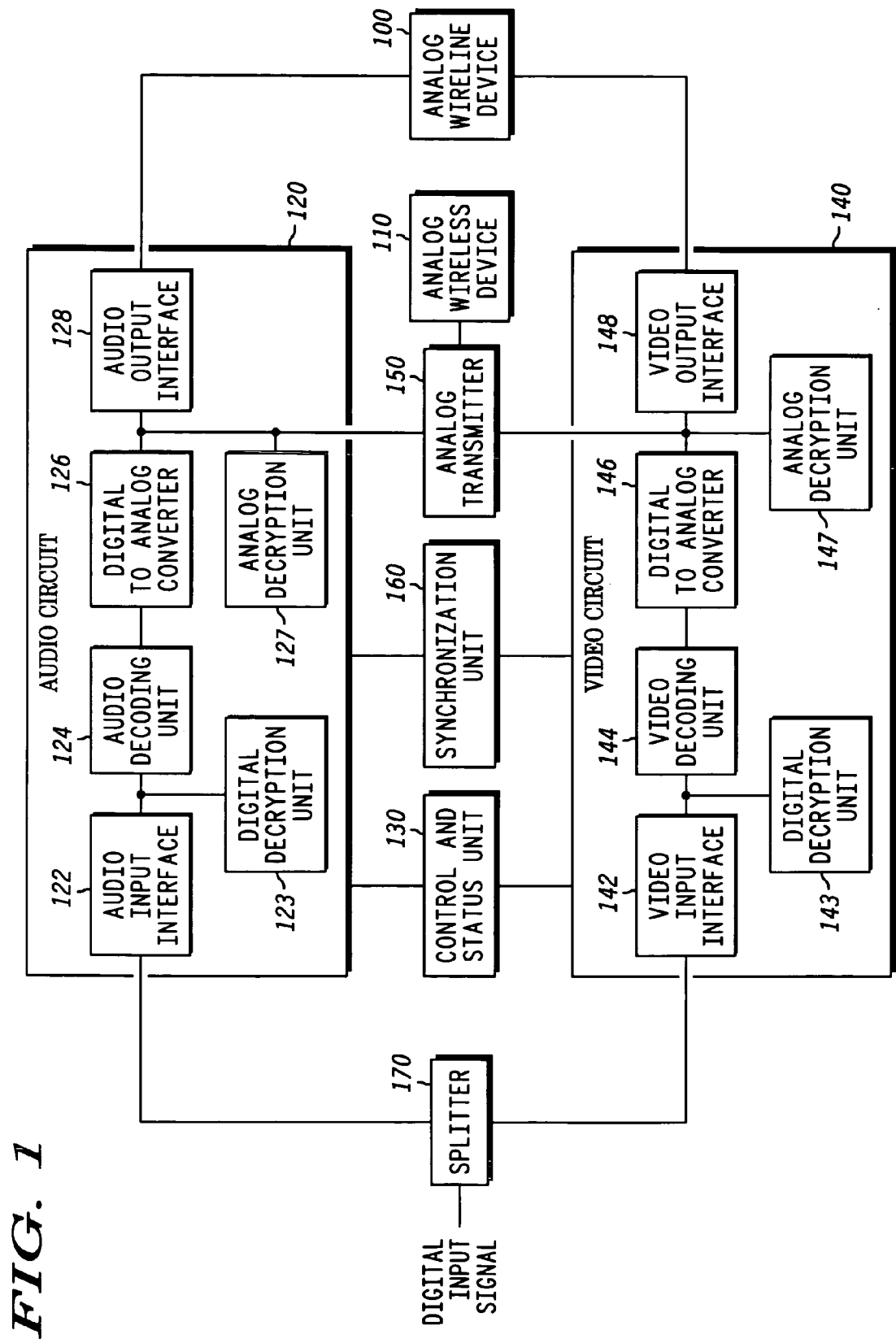
FIG. 1 is a circuit diagram of a system for broadcasting audio and video to an analog device.

In a preferred embodiment of the invention, a method and system is provided for distributing digital audio and/or video to an analog wireline device. More specifically, the preferred embodiment of the invention obtains digital audio and/or video signals and distributes the audio and video content of the digital signals to the analog wireline device. As a result, an analog wireline device which is not designed to receive digital audio or video can play the audio and/or video content.

In one aspect of the preferred embodiment, an audio circuit distributes an analog audio signal to the analog wireline device. An audio input interface receives a digital audio signal and identifies an audio bitstream. Optionally, an audio digital decryption unit decrypts the audio bitstream. An audio decoding unit then decodes the audio bitstream. The audio decoding unit optionally includes a decompression component decompressing the audio bitstream. An audio digital to analog converter converts the decoded audio bitstream to an analog audio signal. Optionally, an audio analog decryption unit decrypts the analog audio signal. An audio output interface distributes the analog audio signal to the analog wireline device.

In another aspect of the preferred embodiment, a video circuit distributes an analog video signal to the analog wireline device. A video input interface receives a digital video signal and identifies a video bitstream. Optionally, a video digital decryption unit decrypts the video bitstream. A video decoding unit then decodes the video bitstream. The video decoding unit optionally includes a decompression component decompressing the video bitstream. A video digital to analog converter converts the decoded video bitstream to an analog video signal. Optionally, a video analog decryption unit decrypts the analog video signal. A video output interface distributes the analog video signal to the analog wireline device.

In yet another aspect of the preferred embodiment, the audio circuit and video circuit are combined to distribute the analog audio signal and analog video signal. An audio input interface receives a digital audio signal and identifies an audio bitstream. Optionally, an audio digital decryption unit decrypts the audio bitstream. An audio decoding unit then decodes the audio bitstream. The audio decoding unit optionally includes a decompression component decompressing the audio bitstream. An audio digital to analog converter converts the decoded audio bitstream to an analog audio signal. Optionally, an audio analog decryption unit decrypts the analog audio signal. A video input interface receives a digital video signal and identifies a video bitstream. Optionally, a video digital decryption unit decrypts the video bitstream. A video decoding unit then decodes the video bitstream. The video decoding unit optionally includes a decompression component decompressing the video bitstream. A video digital to analog converter converts the decoded video bitstream to an analog video signal. Optionally, a video analog decryption unit decrypts the analog video signal. An audio output interface distributes the analog audio signal to the analog wireline device, and a video output interface distributes the analog video signal to the analog wireline device. A synchronization unit synchronizes the output of the analog audio signal and analog video signal.

FIG. 1 is a circuit diagram of a system for broadcasting both audio and video to an analog device. In FIG. 1, an audio circuit 120 obtains a digital audio signal and produces an analog audio signal which can be distributed to an analog wireline device 100 or broadcast to an analog wireless device 110. The analog wireline device 100 is, for example, any one or more of a number of devices including, but not limited to, a cassette recorder, television, video cassette recorder, amplifier, or amplified speakers. The analog wireless device 110 is, for example, any one or more of a number of devices including, but not limited to, a radio, television, cordless telephone or wireless speakers.

The audio circuit 120 contains an audio input interface 122, an optional audio digital decryption unit 123, an audio decoding unit 124, an audio digital to analog converter 126, an optional audio analog decryption unit 127 and an audio output interface 128. One of ordinary skill in the art will implement these components using circuitry best suited to the application at hand. For example, each of the components may be implemented with one or more chips or with software executed by a processor contained therein or in another component of the system shown in FIG. 1, such as a control unit 130, which will be described in more detail below. The functions of these components will be explained in greater detail with references to the flowcharts below.

Similarly, a video circuit 140 obtains a digital video signal and produces an analog video signal which can be distributed to the analog wireline device 100 or broadcast to the analog wireless device 110. The video circuit contains a video input interface 142, an optional video digital decryption unit 143, a video decoding unit 144, a video digital to analog converter 146, an optional video analog decryption unit 147 and a video output interface 148. One of ordinary skill in the art will implement these components using circuitry best suited to the application at hand. For example, each of the components may be implemented with one or more chips or with software executed by a processor contained therein, or in another component of the system shown in FIG. 1, such as the control unit 130. The functions of these components will be explained in greater detail with reference to the flowcharts below.

An analog transmitter 150 mixes the analog audio signal and analog video signal into an analog wireless output signal and transmits the analog wireless output signal to the analog wireless device 110. For example, where the analog wireless device 110 is a radio, the analog transmitter 150 transmits an analog audio signal in the FM or AM band. When both audio and video content are present, a synchronization unit 160 synchronizes processing by the audio circuit 120 and the video circuit 140 to synchronize the output to the analog wireless device 110. If the audio and video are provided as an integrated digital input signal, a splitter 170 separates the digital input signal into the digital audio signal received by the audio circuit 120 and the digital video signal received by the video circuit 140.

The control unit 130 obtains input from a user and controls the audio circuit 120 to play audio and the video circuit 140 to play video in accordance with the user input. The control unit 130 obtains input from a user and controls the audio circuit 120 to process the digital audio signal and the video circuit 140 to process the digital video signal in accordance with the user input. One of ordinary skill in the art will readily implement the control unit 130 in any of a number of different ways, depending on the environment and end device to which the system is applied. For example, where the analog wireless device 110 is a radio, the control unit 130 can be implemented as a control panel or remote control device which obtains a frequency selection from a user and controls the analog transmitter to transmit the analog audio signal at the radio frequency selected by the user. The control unit could also obtain a selection of the AM or FM band by the user. As another example, where the analog wireless device 110 is a television, the control unit 130 can be implemented as a control panel or remote control device which obtains a channel or television frequency selection from a user and controls the analog transmitter to transmit the analog wireless output signal at the television frequency or channel selected by the user. The control unit 130 can also provide for selection from a number of different possible input sources and formats, and for selection from among one or more end devices.

Figure 2:
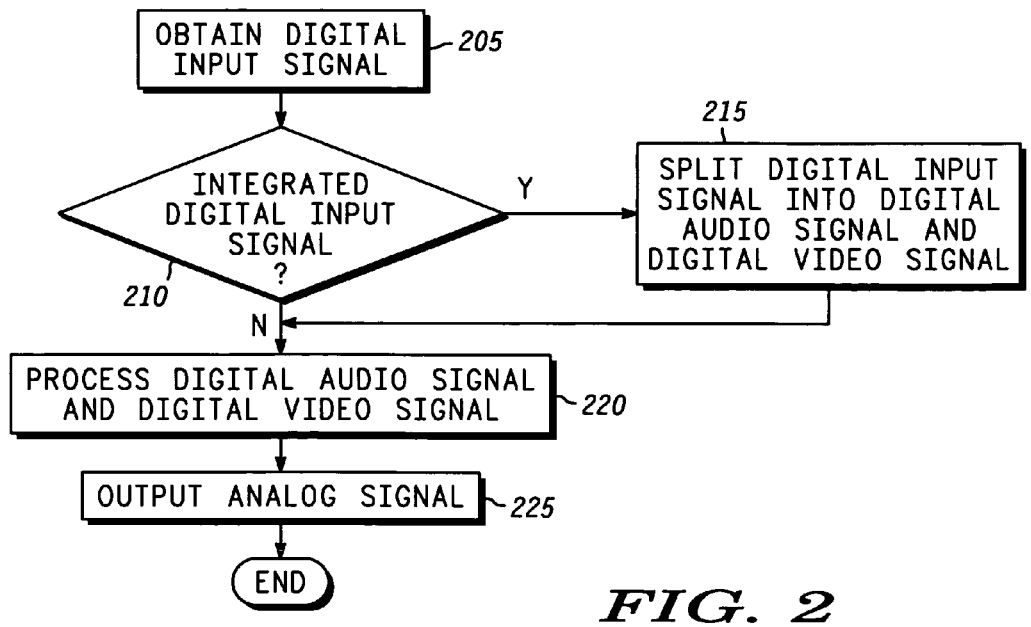
FIG. 2 is a flowchart of the process performed by the system shown in FIG. 1.

FIG. 2 is a flowchart of the process performed by the system shown in FIG. 1. In step 205, the system obtains a digital input signal. The digital input signal may be an integrated audio/video signal or a separate digital audio signal and digital video signal. If the digital input signal is determined in step 210 to be an integrated audio/video signal, the splitter 170 splits the signal in step 215 into a digital audio signal and a digital video signal. The digital audio signal and digital video signal are then processed in step 220 by the audio circuit 120 and the video circuit 140, respectively.

Figure 3:
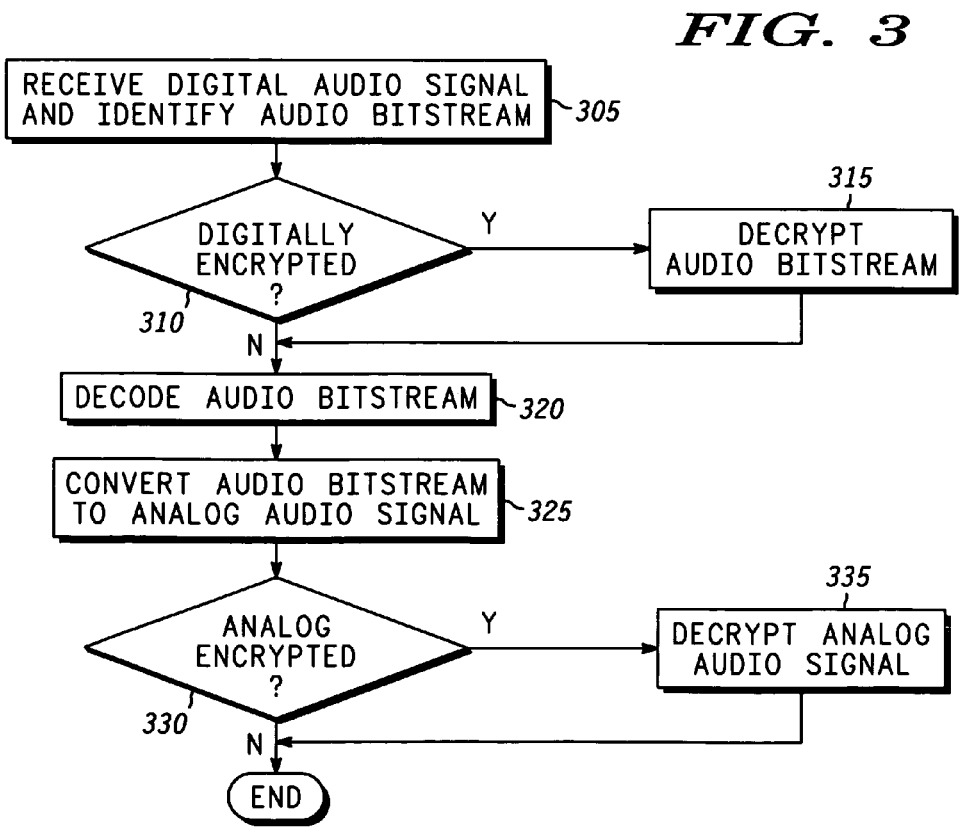
FIG. 3 is a flowchart of the process for processing a digital audio signal.

FIG. 3 is a flowchart of the process performed by the audio circuit 120 to process the digital audio signal in accordance with step 220. In step 305, the audio input interface 122 receives the digital audio signal and identifies an audio bitstream within the digital audio signal. The digital audio signal contains audio data from any of a number of possible sources. For example, the audio input interface 122 can receive the digital audio signal from a network such as via the internet or an intranet. As another example, the audio input interface 122 can receive the digital audio signal from a local storage device, such as a CD-ROM, DVD or hard disk. As yet another example, the digital audio signal can be produced by a computer application such as a text-to-speech application or a digital musical instrument.

One of ordinary skill in the art will readily implement the audio input interface 122 to receive a digital audio signal in any of a number of possible formats from any of a number of possible sources. The audio input interface 122 can be implemented, for example, using physical layer interface types such as USB, IEEE 1394-1995 and IEEE 802.x, and using protocols such as HTTP, TCP/IP, and UDP/IP. Depending on the source and format of the digital audio signal, the audio input interface 122 performs other functions in addition to identifying the audio bitstream. Such functions include, but are not necessarily limited to, physical layer functions such as error correction, etc., transport layer functions such as device addressing, etc., session layer functions such as content provider selection, and so forth.

If the audio bitstream is determined in step 310 to have been digitally encrypted, the audio digital decryption unit 123 digitally decrypts the audio bitstream in step 315. Possible applications of the invention described herein may require the digital audio signal to be digitally encrypted so that only authorized devices can use the audio content therein, such as premium channels, classified information, copy protection, and pay-per-listen content. The control unit 130 controls the audio digital decryption unit 123 to decrypt only authorized digital audio. One of ordinary skill in the art will readily implement the audio digital decryption unit 123 utilizing available hardware, software, and so forth.

In step 320, the audio decoding unit 124 decodes the audio bitstream. One of ordinary skill in the art will implement the audio decoding unit 124 based on the environment and application at hand, utilizing available hardware, software, etc. to decode the data based on any of a number of possible encoding methods with which the audio bitstream has been encoded. Such encoding methods include, but are not limited to, ADPCM, CD-DA, ITU G.711, G.722, G.723 & G.728, MPEG I, II & III, AC-3, AIFF, AIFC, AU, Pure Voice, Real Audio and WAV. Depending on the encoding method, data compression may also be included, in which case step 320 includes the step of decompressing the audio bitstream and the audio decoding unit 124 includes a decompression component.

In step 325, the audio digital to analog converter 126 converts the audio bitstream to an analog audio signal. One of ordinary skill in the art will readily implement the audio digital to analog converter 126 utilizing an available digital to analog converter. If the analog audio signal is determined in step 330 to have been analog encrypted, then the audio analog decryption unit 127 decrypts the analog audio signal in step 335. Possible applications of the invention described herein require the analog audio signal to be analog encrypted so that only authorized devices can use the analog audio or because the audio content is copy protected. The control unit 130 controls the audio analog decryption unit 127 to decrypt only authorized digital audio.

Figure 4:
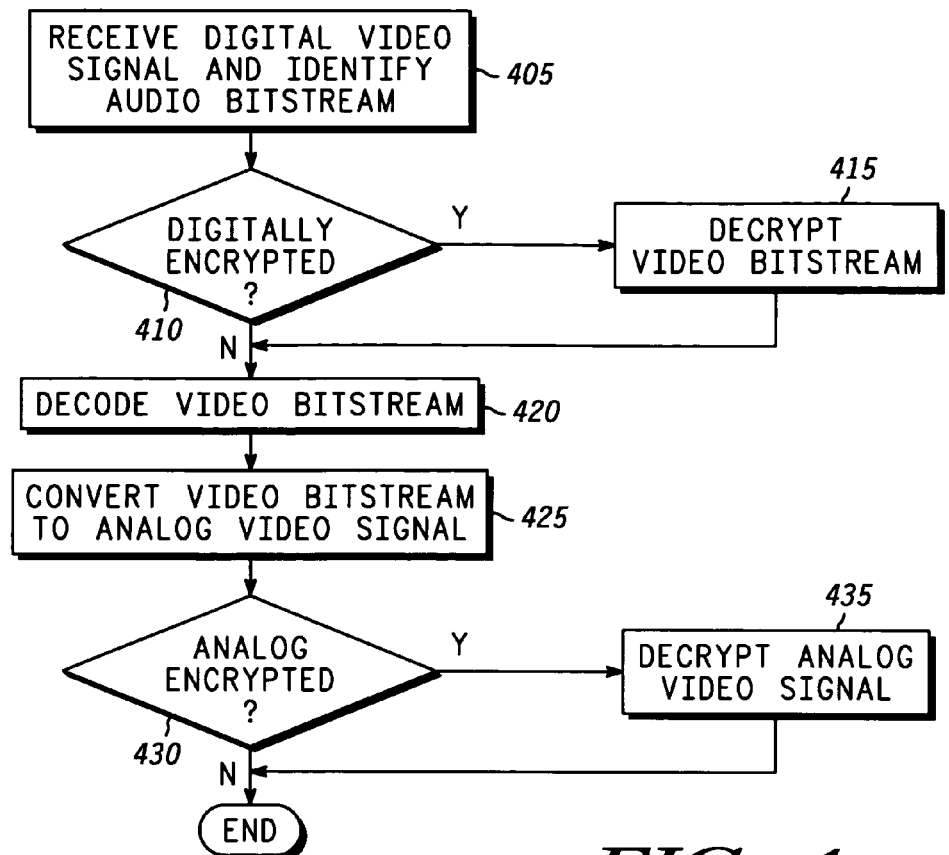
FIG. 4 is a flowchart of the process for processing a digital video signal.

FIG. 4 is a flowchart of the process performed by the video circuit 140 to process the digital video signal in accordance with step 220. The process is essentially the same as that performed by the audio circuit 120 to process the digital audio signal. In step 405, the video input interface 142 receives the digital video signal and identifies a video bitstream within the digital video signal. The digital video signal contains video data from any of a number of possible sources. For example, the video input interface 142 can receive the digital video signal from a network such as via the internet or an intranet. As another example, the video input interface 142 can receive the digital video signal from a local storage device, such as a CD-ROM, DVD or hard disk. As yet another example, the digital video signal can be produced by a digital video camera.

One of ordinary skill in the art will readily implement the video input interface 142 to receive a digital video signal in any of a number of possible formats from any of a number of possible sources. The video input interface 142 can be implemented, for example, using physical layer interface types such as USB, IEEE 1394-1995 and IEEE 802.x, and using protocols such as HTTP, TCP/IP, and UDP/IP. Depending on the source and format of the digital video signal, the video input interface 142 performs other functions in addition to identifying the video bitstream. Such functions include, but are not necessarily limited to, physical layer functions such as error correction, etc., transport layer functions such as device addressing, etc., session layer functions such as content provider selection, and so forth.

If the video bitstream is determined in step 410 to have been digitally encrypted, the video digital decryption unit 143 digitally decrypts the video bitstream in step 415. Possible applications of the invention described herein may require the digital video signal to be digitally encrypted so that only authorized devices can use the video content therein, such as premium channels, classified information, copy protection, and pay-per-view content. The control unit 130 controls the video digital decryption unit 143 to decrypt only authorized digital video. One of ordinary skill in the art will readily implement the video digital decryption unit 143 utilizing available hardware, software, and so forth.

In step 420, the video decoding unit 144 decodes the video bitstream. One of ordinary skill in the art will implement the video decoding unit 144 based on the environment and application at hand, utilizing available hardware, software, etc. to decode the data based on any of a number of possible encoding methods with which the video bitstream has been encoded. Such encoding methods include, but are not limited to, ITU H.261 & H.263, Motion JPEG, MPEG-1, MPEG-2 and MPEG-4, Cinepak, ClearVideo, Sony DV, Indeo, Real Video, Sorensen and VDOLive. Depending on the encoding method, data compression may also be included, in which case step 420 includes the step of decompressing the video bitstream and the video decoding unit 144 includes a decompression component.

In step 425, the video digital to analog converter 146 converts the video bitstream to an analog video signal. One of ordinary skill in the art will readily implement the video digital to analog converter 146 utilizing an available digital to analog converter. If the analog video signal is determined in step 430 to have been analog encrypted, then the video analog decryption unit 147 decrypts the analog video signal in step 435. Possible applications of the invention described herein may require the analog video signal to be analog encrypted so that only authorized devices can use the analog video or because the video content is copy protected. The control unit 130 controls the video analog decryption unit 147 to decrypt only authorized digital video.

Figure 5:
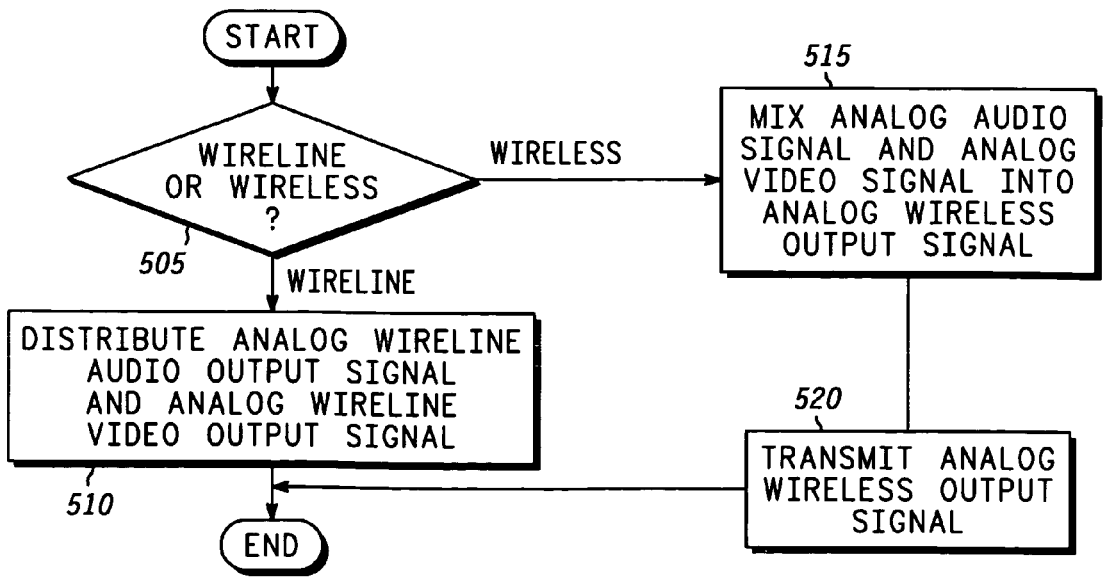
FIG. 5 is a flowchart of the process for outputting the digital audio and video to the analog device.

Returning now to FIG. 2, upon processing the digital audio signal and digital video signal in step 220, the system outputs in step 225 the appropriate analog signal to the end device. FIG. 5 is a flowchart of this output process. The system determines in step 505 whether the end device is an analog wireline device 100 or an analog wireless device 110. If the end device is an analog wireline device 100, then the audio output interface 128 distributes in step 510 the analog audio signal and the video output interface 148 distributes the analog video signal to the analog wireline device 100 via wireline. One of ordinary skill in the art will readily implement the audio output interface 128 and video output interface 148 utilizing available hardware, software, etc. to provide the appropriately formatted wireline signals, depending on the input format expected by the analog wireline device 100. For example, the audio output interface 128 can distribute the analog audio signal to a cassette recorder, amplifier or amplified speakers using a standard line out connection. Similarly, the video output interface 148 can distribute the analog video signal to a television or video cassette recorder using a standard Composite Video or S-Video connection. One of ordinary skill in, the art will also readily extend the implementation to distribute the analog audio signal and/or analog video signal to multiple devices, as desired for the application at hand.

If the end device is an analog wireless device 110, then the analog transmitter 150 mixes in step 515 the analog audio signal and the analog video signal to produce an analog wireless output signal and transmits in step 520 the analog wireless output signal to the analog wireless device 110. One of ordinary skill in the art will readily implement the analog transmitter to provide the appropriately formatted wireless signals, depending on the input format expected by the analog wireless device 110. For example, the analog transmitter 150 can transmit to a radio in a radio frequency in the AM or FM band, to a television in a television frequency or channel, or to wireless speakers and headphones in the 900 Mhz frequency band. Alternatively, where the end device is a wireline device that receives a transmitted signal, such as a cable television, the analog transmitter 150 transmits an analog output signal to a wireline device instead of distributing the analog audio signal and the analog video signal in step 510. One of ordinary skill in the art will also readily extend the implementation to transmit the analog audio signal, analog video signal or analog wireless output signal to multiple devices, as desired for the application at hand.

It should be appreciated that the invention described herein provides the capability of playing digital audio and/or video with a device designed to receive a different form of input. The present invention has been described above with reference to preferred embodiments. However, those skilled in the art will recognize that changes and modifications may be made in these preferred embodiments without departing from the scope of the present invention. For example, one of ordinary skill in the art will recognize circumstances where the components of the audio circuit 120 and the video circuit 140 may be differently arranged such that the functions performed thereby will be performed in a different order, as desired. Changes and modifications which are obvious to those skilled in the art are intended to be included within the scope of the present invention.

What is claimed is:

1. A system for distributing audio content of a digital audio signal to a analog wireline device, comprising:
   an audio input interface receiving the digital audio signal from a plurality of sources and identifying an audio bitstream, wherein the audio bitstream comprises audio data based on a plurality of encoding methods corresponding to the plurality of sources;
   an audio decoding unit connected to the audio input interface and decoding the audio bitstream;
   an audio digital to analog converter connected to the audio decoding unit and converting the audio bitstream to an analog audio signal; and
   an audio output interface connected to the audio digital to analog converter and distributing the analog audio signal to the analog wireline device.

2. The system of claim 1, further comprising an audio digital decryption unit connected to the audio input interface and decrypting the audio bitstream.

3. The system of claim 1, further comprising an audio analog decryption unit connected to the audio digital to analog converter and decrypting the analog audio signal.

4. The system of claim 1 wherein the audio output interface distributes the analog audio signal to multiple devices.

5. The system of claim 1 wherein the audio input interface receives the digital audio signal from a network.

6. The system of claim 1 wherein the audio input interface receives the digital audio signal from a local storage device.

7. The system of claim 1 wherein the audio input interface receives the digital audio signal produced by a text-to-speech application.

8. The system of claim 1 wherein the audio input interface receives the digital audio signal produced by a digital musical instrument.

9. A system for distributing video content of a digital video signal to a analog wireline device, comprising:
   a video input interface receiving the digital video signal from a plurality of sources and identifying a video bitstream, wherein the video bitstream comprises video data based on a plurality of encoding methods corresponding to the plurality of sources;
   a video decoding unit connected to the video input interface and decoding the video bitstream;
   a video digital to analog converter connected to the video decoding unit and converting the video bitstream to an analog video signal; and
   a video output interface connected to the video digital to analog converter and distributing the analog video signal to the analog wireline device.

10. The system of claim 9, further comprising a video digital decryption unit connected to the video input interface and decrypting the video bitstream.

11. The system of claim 9, further comprising a video analog decryption unit connected to the video digital to analog converter and decrypting the analog video signal.

12. The system of claim 9 wherein the video output interface distributes the analog video signal to multiple devices.

13. The system of claim 9 wherein the video input interface receives the digital video signal from a network.

14. The system of claim 9 wherein the video input interface receives the digital video signal from a local storage device.

15. The system of claim 9 wherein the video input interface receives the digital video signal produced by a digital video camera.

16. A system for distributing audio and video content of a digital audio signal and a digital video signal to an analog wireline device, comprising:
   an audio input interface receiving the digital audio signal from a plurality of sources and identifying an audio bitstream, wherein the audio bitstream comprises audio data based on a plurality of encoding methods corresponding to the plurality of sources;
   an audio decoding unit connected to the audio input interface and decoding the audio bitstream;
   an audio digital to analog converter connected to the audio decoding unit and converting the audio bitstream to an analog audio signal;
   an audio output interface connected to the audio digital to analog converter and distributing the analog audio signal to the analog wireline device;
   a video input interface receiving the digital video signal from the plurality of sources and identifying a video bitstream, wherein the video bitstream comprises video data based on a plurality of encoding methods corresponding to the plurality of sources;
   a video decoding unit connected to the video input interface and decoding the video bitstream;
   a video digital to analog converter connected to the video decoding unit and converting the video bitstream to an analog video signal;
   a video output interface connected to the video digital to analog converter and distributing the analog video signal to the television; and
   a synchronization unit connected to the audio output interface and the video output interface and synchronizing the analog audio signal and the analog video signal.

17. The system of claim 16, further comprising a splitter receiving a digital input signal and splitting the digital input signal into the digital audio signal and the digital video signal.

18. The system of claim 16 wherein the video input interface receives the digital video signal from a network.

19. The system of claim 16 wherein the video input interface receives the digital video signal from a local storage device.

20. The system of claim 19 wherein the video input interface receives the digital video signal produced by a digital video camera.

21. A method for distributing audio content of a digital audio signal to an analog wireline device, comprising the steps of:
   receiving the digital audio signal from a plurality of sources and identifying an audio bitstream, wherein the audio bitstream comprises audio data based on a plurality of encoding methods corresponding to the plurality of sources;
   decoding the audio bitstream;
   converting the audio bitstream to an analog audio signal; and
   distributing the analog audio signal to the analog wireline device.

22. The method of claim 21, further comprising the steps of decrypting the audio bitstream.

23. The method of claim 21, further comprising the steps of decrypting the analog audio signal.

24. The method of claim 21 wherein the step of decoding the audio bitstream includes decompressing the audio bitstream.

25. A method for distributing video content of a digital video signal to an analog wireline device, comprising the steps of:
   receiving the digital video signal from a plurality of sources and identifying a video bitstream, wherein the video bitstream comprises video data based on a plurality of encoding methods corresponding to the plurality of sources;

decoding the video bitstream;

converting the video bitstream to an analog video signal; and distributing the analog video signal to the analog wireline device.

26. The method of claim 25, further comprising the steps of decrypting the video bitstream.

27. The method of claim 25, further comprising the steps of decrypting the analog video signal.

28. The method of claim 25 wherein the step of decoding the video bitstream includes decompressing the video bitstream.

29. A method for distributing audio and video content of a digital audio signal and a digital video signal to an analog wireline device, comprising the steps of:

receiving the digital audio signal from a plurality of sources and identifying an audio bitstream, wherein the audio bitstream comprises audio data based on a plurality of encoding methods corresponding to the plurality of sources;

decoding the audio bitstream;

converting the audio bitstream to an analog audio signal;

receiving the digital video signal from a plurality of sources and identifying a video bitstream, wherein the video bitstream comprises video data based on a plurality of encoding methods corresponding to the plurality of sources;

decoding the video bitstream;

converting the video bitstream to an analog video signal; and distributing the analog audio signal and the analog video signal to the analog wireline device.

30. The method of claim 29, further comprising the steps of:

receiving a digital input signal as an integrated digital input signal; and splitting the digital input signal into the digital audio signal and the digital video signal.

* * * * *

UNITED STATES PATENT AND TRADEMARK OFFICE
CERTIFICATE OF CORRECTION

| | | |
|---|---|---|
| PATENT NO. | : 7,647,615 B1 | Page 1 of 1 |
| APPLICATION NO. | : 09/071046 | |
| DATED | : January 12, 2010 | |
| INVENTOR(S) | : Reinold et al. | |

It is certified that error appears in the above-identified patent and that said Letters Patent is hereby corrected as shown below:

On the Title Page

1. Item (75), under "Inventors", Line 5, delete "Phonenix," and insert -- Phoenix, --, therefor.

2. In Column 1, Line 15, delete "09,073,368." and insert -- 09/073,368. --, therefor.

3. In Column 6, Line 27, delete "in," and insert -- in --, therefor.

Signed and Sealed this
Fourth Day of October, 2011

David J. Kappos
*Director of the United States Patent and Trademark Office*